United States Patent Office 3,378,499
Patented Apr. 16, 1968

3,378,499
SYNTHESIS OF HALOPHOSPHATE PHOSPHORS USING CALCIUM CHLORSPODIOSITE
Robert L. Hickok, Euclid, Ohio, assignor to General Electric Company, a corporation of New York
No Drawing. Filed Dec. 8, 1965, Ser. No. 512,537
3 Claims. (Cl. 252—301.4)

ABSTRACT OF THE DISCLOSURE

A method for preparing chlorine-containing calcium halophosphate phosphors activated by antimony and manganese by firing a batch wherein the chlorine ingredient is supplied in the batch at least predominantly as calcium chlorspodiosite, $Ca_2ClPO_4$. Since the $Ca_2ClPO_4$ decomposes above the temperatures at which most volatiles are expelled from the batch, and at about the temperature of formation of the halophosphate phosphor, its chlorine content is used effectively and need not be supplied in the excesses needed in the prior art.

---

The present invention relates to the production of halophosphate phosphors useful in lamps. More particularly, it relates to an improved process in which the chlorine ingredient in the batch is provided in a more stable form.

Halophosphate phosphors used in fluorescent lamps are chemically and structurally related to calcium fluorapatite, $Ca_{10}F_2(PO_4)_6$. The phosphors contain divalent manganese, $Mn^{+2}$, and trivalent antimony, $Sb^{+3}$, as activator and co-activator or sensitizer respectively, which are substituted for part of the calcium. Some phosphors are prepared in which cadmium, $Cd^{+2}$, also is substituted for part of the calcium. Proper color balance of the emitted light is achieved by substituting chloride for part of the fluoride. Charge compensation to accommodate the $Sb^{+3}$ is achieved by substitution of divalent oxide, $O^{-2}$ for part of the monovalent halide, $X^{-1}$. A halophosphate phosphor might typically have an empirical formula similar to $$Ca_{9.60}Cd_{0.10}Mn_{0.20}Sb_{0.10}F_{1.75}Cl_{.15}(PO_4)_{6.00}O_{0.10}$$

or, more generally stated, $$M_5(PO_4)_3(X):Sb, Mn$$

wherein M is Ca which may have small amounts of Cd substitution, and X is a halogen selected from the group consisting of F, Cl, and mixtures thereof. In addition to or in partial substitution for calcium, other divalent cations may, as known in the art, be used such as cadmium, strontium, barium, magnesium and zinc, preferably in amounts less than 0.50 atom per mole of phosphor.

Synthesis of halophosphate phosphors is typically carried out by firing to high temperature, i.e., 1000–1200° C., a mixture of reactants which can include $CaHPO_4$, $CaCO_3$, CdO, $MnCO_3$, $Sb_2O_3$, $CaF_2$ and $NH_4Cl$. During the course of reaction a variety of volatile products are formed which must be allowed to escape. These include $H_2O$, $CO_2$, $NH_3$, $O_2$ and possibly others. Also formed during the synthesis are other volatile compounds which can either react to become incorporated in the phosphor or can escape with the gases necessarily expelled. The volatile intermediates in this class might include $SbCl_3$, $CdCl_2$ and $POCl_3$ among others. The loss of such compounds has two undesirable consequences: (1) These losses are not readily controlled directly and can lead to phosphors whose composition deviates from the intended composition such as in stoichiometry. The result of this can be poor performance with respect to emission color, efficiency or body color. (2) These losses are uneconomical because large excesses of some reactants over theoretically required amounts must be used in compensation, such as approximately: $Sb_2O_3$, 300%, CdO, 130%; and $NH_4Cl$, 250%.

All, or nearly all, of the compounds whose loss is undesirable are chlorides or oxychlorides. The volatilities of some of these chlorides serves to illustrate the point and are indicated here by their boiling points, e.g., $SbCl_3$, 280° C.; $CdCl_2$, 960° C.; $POCl_3$, 105° C. When these compounds are formed at low temperatures early in the reaction sequence, as occurs when $NH_4Cl$ is present, they can be, and are, swept out of the firing mixture by escaping $CO_2$ and $H_2O$, as well as escaping on their own.

It is an object of the present invention to provide an improved process for the synthesis of halophosphate phosphors in which the chloride ingredient is provided in a form such that its loss due to volatilization on firing is greatly lessened.

Another object is to provide such a process in which the cost of the required ingredients is greatly lowered by more efficient utilization with less wastage during firing.

Further objects and advantages of the invention will appear from the following detailed description of species thereof.

Briefly stated, the present invention in one of its aspects provides for the use of calcium chlorspodiosite, $Ca_2ClPO_4$, in substitution for $NH_4Cl$, as at least the predominant source of chlorine in the production of halophosphate phosphors.

A useful firing schedule consists of firing at about 1100 to 1200° C. for about 1 to 2 hours, then comminuting and blending the batch, and then firing again at about 1000 to 1200° C. for about 1 to 2 hours.

$Ca_2ClPO_4$ is much more stable thermally and chemically than $NH_4Cl$. The volatility and reactivity of $NH_4Cl$ at the relatively low temperatures which occur in the earlier stages of reaction for phosphor formation are preferably avoided, and the present invention provides a means for doing so. The use of $Ca_2ClPO_4$ allows the halophosphate to form by an orderly reaction sequence. Further, the use of $Ca_2ClPO_4$ as the source of chloride, when proper firing procedures are used, can result in the incorporation of an exactly predetermined amount of chloride into the phosphor. In addition, the use of $Ca_2ClPO_4$, when proper firing procedures are used, can result in the incorporation of higher concentrations of $Sb^{+3}$ in the halophosphate than can be obtained conveniently using $NH_4Cl$ as the source of chloride, e.g., up to 1.8% by weight Sb opposed to about 1.0% formerly feasible.

It is apparent that the advantages of using $Ca_2ClPO_4$ can be obtained substantially by the use of the compound as the predominant but not sole source of the chlorine ingredient in the batch for production of halophosphate phosphors.

As a substitute for $NH_4Cl$, it is desirable to have a compound which is nonhygroscopic and of good purity, reliable stoichiometry, controllable particle size, and sufficient crystallinity. $Ca_2ClPO_4$ meets these criteria satisfactorily, and is readily prepared in the desired form in accordance with the teachings of application Serial No. 512,505, filed concurrently herewith.

The $Ca_2ClPO_4$ used in these experiments was prepared by firing a 1:1 mole mixture of $Ca_3(PO_4)_2$ and CaO (formed by reaction of $CaHPO_4$ with $CaCO_3$) with three moles $NH_4Cl$ at 810° C. for two hours in a loosely closed crucible. The resulting cake was quite hard but disintegrated in water to give the desired product in good yield as a finely divided powder. The particle size of the $Ca_2ClPO_4$ was little different than that of the $CaHPO_4$ used in the initial preparation of $Ca_3(PO_4)_2$. Analysis by X-ray diffraction showed that no detectable impurities were present.

Among the properties possessed by $Ca_2ClPO_4$ which make it desirably useful in the synthesis of halophosphate phosphors are the following:

(1) $Ca_2ClPO_4$ is thermally stable, when pure, to a temperature in excess of 1000° C. The decomposition temperature is given by R. Nacken as 1040° C., Centralblatt L. Mineralogie, Geologie u. Paläontalogie, 1912, pp. 545–559. At this temperature incongruent melting occurs with the formation of chlorapatite, $Ca_{10}Cl_2(PO_4)_6$ and a liquid phase composed principally of calcium chloride, $CaCl_2$.

(2) When $Ca_2ClPO_4$ is heated with calcium fluoride, $CaF_2$, the decomposition occurs at a temperature at least 100° C. lower than that of pure $Ca_2ClPO_4$. This reaction yields an apatite containing both fluoride and chloride in which the fluoride to chloride mole ratio depends on the relative amounts of $Ca_2ClPO_4$ and $CaF_2$ present. The liquid phase is a solution of $CaF_2$ and $CaCl_2$ in which some calcium phosphate is dissolved. The reaction is believed to begin as the temperature reaches the melting point of the $CaF_2$—$CaCl_2$ eutectic, e.g. ~660° C.

(3) When $Ca_2ClPO_4$ is heated with calcium phosphate, $Ca_3(PO_4)_2$, or with a suitable combination of chemicals to give $Ca_3(PO_4)_2$ a reaction occurs to give chlorapatite. This reaction begins at a temperature substantially below 1040° C. and proceeds rapidly to consume all available chloride in apatite formation if sufficient calcium phosphate is present.

(4) $Ca_2ClPO_4$ is chemically inert towards the other components of the halophosphate firing mixture at room temperature and is non-hygroscopic.

(5) $Ca_2ClPO_4$ appears to exist only as a stoichiometric compound of definite composition. The chloride content of 1 gram atom per 210.6 g. makes the $Ca_2ClPO_4$ a minor constitutent in a firing mixture which yields a phosphor of the stated typical composition.

(6) $Ca_2ClPO_4$ can be conveniently prepared as a finely divided powder of high purity and stored indefinitely without decompositon or caking.

The presence of a flux during the formation of halophosphates has been shown to be beneficial in improving the crystallinity of the particles without causing significant particle growth or sintering under certain conditions. The preferable condition for obtaining the desired effect was the complete consumption of the flux during the reaction. $CaCl_2$ or a mixture of $CaCl_2$ and $CaF_2$ was found to be ideal, and if they completely reacted little sintering occurred. $Ca_2ClPO_4$ melts incongruently at about 1040° C. to give chlorapatite and a melt rich in calcium chloride. In the present of $CaF_2$ the melting point is probably lowered due to the existence of a eutectic in the system $CaCl_2$–$CaF_2$ near 650° C. Thus the advantages of $Ca_2ClPO_4$ as a source of chloride are several. It functions as a stable and fairly unreactive chloride source until heated to a temperature near the minimum required for apatite formation and then melts to furnish not only the necessary chloride for reaction but also furnishes a molten salt phase which by serving as a transport medium improves the crystallinity of the apatite.

Phosphors were prepared according to the present invention as follows with a base-to-acid ratio of total divalent metals (Ca, Cd, Mn):6(PO$_4$) of 9.83:1. Reactants used in preparing the firing mixture for Samples 1 and 2 are listed below:

| Reactant | Moles | Weight (gm.) |
|---|---|---|
| $CaHPO_4$ | 21.50 | 2,925 |
| $CaCO_3$ | 8.64 | 863 |
| $CaF_2$ | 3.18 | 250 |
| $Ca_2ClPO_4$ | 0.55 | 115 |
| $Sb_2O_3$ | 1.33 | 97 |
| $MnCO_3$ | .64 | 78 |
| CdO | .35 | 45 |

These reactants were blended 10 minutes in a two-gallon twin-shell blender. The entire batch was first fired at 1140° C. for about 2 hours. After firing, the sample was milled, screened through an 80-mesh silk screen, and divided into two lots for a second firing. The second firing of Sample 1 was in a nitrogen atmosphere ($O_2<0.5\%$) in uncovered trays at 1000° C. for about 2 hours. The second firing of Sample 2 was in covered trays with an air atmosphere in the furnace at 1140–1145° C. for about 2 hours.

Indications are that smaller excess amounts of Sb, Mn and Cd would give even better results than those achieved with these tests. However, these amounts are also affected by volatility-limiting factors in the particular furnace used, and the desired final composition in terms of Sb (see Patent 3,109,819, Gillooly et al.), Mn and Cd.

A sample of the phosphors prepared as described above by second firing in nitrogen gives the plaque brightness results for Sample 1 in Table I below. The sample prepared by double firing in a self-generated atmosphere was tested as Sample 2. The table gives percent of total brightness as compared to a comparable standard commercial phosphor, percent ultraviolet absorbed and Fischer Sub-sieve Size average particle diameter (FSS APD) in microns.

TABLE I.—PHOSPHOR PLAQUE TESTS

| Sample | Percent Total | Percent UV Ab. | FSS APD ($\mu$) |
|---|---|---|---|
| No. 1 | 100.0 | 91.9 | 5.1 |
| No. 2 | 103.0 | 91.9 | 5.8 |

Lamps were made from these phosphors and tested for their brightness, maintenance of light output and color in I.C.I. $x$ and $y$ coordinates in comparison with a control. The control was prepared by routine procedures in which chloride was added as ammonium chloride, with other reactants and techniques comparable with those used for the tests. These results show that phosphors prepared according to the invention are quite satisfactory in comparison with previous standard phosphors. It is expected that further optimization of the process of the invention would lead to further improvements in characteristics including color.

TABLE II.—LAMP DATA

| Sample | 0 Hr. | | 100 Hrs. | | | Color | | |
|---|---|---|---|---|---|---|---|---|
| | Lumens | L/W | Lumens | L/W | Maintenance (percent) | x | y | G/B |
| No. 1 | 3,218 | 75.9 | 2,171 | 75.1 | 98.5 | .3659 | .3727 | 5.3 |
| No. 2 | 3,213 | 76.1 | 3,155 | 74.6 | 98.3 | .3691 | .3750 | 5.9 |
| Control | 3,264 | 76.7 | 3,189 | 75.5 | 97.9 | .3721 | .3720 | 5.8 |

What I claim as new and desire to secure by Letters Patent of the United States is:

1. A method of preparing chlorine-containing calcium halophosphate phosphor activated by antimony and manganese which comprises firing at temperatures above 660° C. for a time sufficient to form the phosphor a batch of ingredients containing the constituent elements of the desired phosphor, the chlorine ingredient being supplied in said batch at least predominantly in the form of $Ca_2ClPO_4$.

2. The process of claim 1 in which the ingredients of said batch include, in addition to $Ca_2ClPO_4$: $CaHPO_4$, $CaCO_3$, $CdO$, $MnCO_3$, $Sb_2O_3$, and $CaF_2$.

3. The process of claim 1 in which the batch is fired at about 1100 to 1200° C. for about 1 to 2 hours, the batch is then comminuted and blended and then fired again at about 1000 to 1200° C. for about 1 to 2 hours.

References Cited

UNITED STATES PATENTS

| 2,434,764 | 1/1948 | Froelich et al. | 252—301.4 |
| 2,862,888 | 12/1958 | Ross | 252—301.4 |
| 2,904,516 | 9/1959 | Ross et al. | |

OSCAR R. VERTIZ, *Primary Examiner.*

H. S. MILLER, *Assistant Examiner.*